Figure 1:
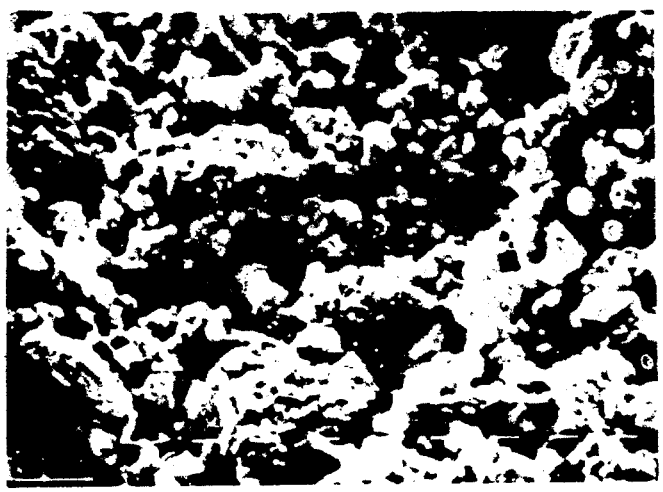

United States Patent [19]

Parcevaux et al.

[11] Patent Number: 4,537,918

[45] Date of Patent: Aug. 27, 1985

[54] CEMENT COMPOSITIONS FOR CEMENTING WELLS, ALLOWING PRESSURE GAS-CHANNELING IN THE CEMENTED ANNULUS TO BE CONTROLLED

[75] Inventors: Philippe A. Parcevaux; Bernard M. Piot, both of Saint Etienne; Claude J. Vercaemer, Sorbiers, all of France

[73] Assignee: Etudes et Fabrication Dowell Schlumberger, France

[21] Appl. No.: 480,334

[22] Filed: Mar. 30, 1983

[30] Foreign Application Priority Data

Apr. 6, 1982 [FR] France .................................. 82 05983
Jan. 24, 1983 [FR] France .................................. 83 01031

[51] Int. Cl.$^3$ .................. C04B 7/35; E21B 33/14; E21B 43/10
[52] U.S. Cl. ................................. 523/130; 166/293; 524/3; 524/6; 524/8
[58] Field of Search .................. 523/130; 524/3, 6, 8; 166/293

[56] References Cited

U.S. PATENT DOCUMENTS

| Re. 28,722 | 2/1976 | Sanders | 524/8 |
|---|---|---|---|
| 2,646,846 | 7/1953 | Cutforth | 524/3 |
| 3,043,790 | 7/1962 | Sanders | 524/8 |
| 3,228,907 | 1/1966 | Eash | 524/3 |
| 3,250,736 | 5/1966 | Gibbs | 524/3 |
| 3,354,169 | 11/1967 | Shafer | 524/8 |
| 3,895,953 | 7/1975 | Mehta | 524/8 |
| 4,009,135 | 2/1977 | Harreus | 524/3 |
| 4,039,345 | 8/1977 | Emig | 524/8 |
| 4,086,201 | 4/1978 | Peters | 524/8 |
| 4,088,804 | 5/1978 | Cornwell | 524/6 |

FOREIGN PATENT DOCUMENTS

| 560338 | 7/1958 | Canada | 524/6 |
|---|---|---|---|
| 1023090 | 5/1964 | United Kingdom | 524/8 |

*Primary Examiner*—C. Warren Ivy
*Attorney, Agent, or Firm*—Ostrolenk, Faber, Gerb & Soffen

[57] ABSTRACT

The invention relates to cement compositions for cementing wells, which allow pressure gas-channeling to be effectively controlled up to more than about 485° F. The cement composition contains a styrene-butadiene latex and a stabilizer. The film of latex interrupts gas-channeling after an extremely brief path.

17 Claims, 10 Drawing Figures

CEMENT COMPOSITIONS FOR CEMENTING WELLS, ALLOWING PRESSURE GAS-CHANNELING IN THE CEMENTED ANNULUS TO BE CONTROLLED

The invention relates to cement compositions for the oil industry whose components, which form an original combination, inhibit the so-called "gas-channeling" phenomenon as soon as it appears, by an entirely novel mechanism.

The notion of gas-channeling (channeling of gas under pressure in the cemented annulus) is very well known to professionals in oil well cementing.

However, it has been noted that gas-channeling occurs after injection of the cement slurry in the annular space between the rocks traversed and the casing of the well, when the well traverses a pocket of gas under pressure.

The gas-channeling phenomenon can occur during setting of a cement slurry from the moment when the slurry attains a degree of set such that the hydrostatic pressure of the cement column is no longer fully transmitted to the zone of the gas pocket but the slurry is still not sufficiently set to prevent that gas from channeling through the partially set slurry.

The gas under pressure then flows through the cement column during setting, and/or between the cement and the rocks traversed, creating in the cement multiple channels which may reach the surface.

This phenomenon may, moreover, be promoted by shrinkage of the cement and possibly by fluid loss from the cement slurry when the rocks traversed are porous.

Gas-channeling is therefore a very serious problem which causes embrittlement of the cement and problems connected with surface safety.

The number of attempts to solve this problem is indicative of its seriousness and of the major preoccupation of oil-men on this subject for many years.

The total or partial lack of success of these attempts is also an indication of the difficulties encountered, which have not yet been overcome or only partially so, despite the need felt therefor by virtually all oil companies, and even when the gas is under a relatively low pressure.

It will further be noted that imperatives inherent in well cementing techniques complicate the problem: in particular, if additives are used, the slurry must remain easily pumpable for several hours and, in general, its characteristics and the efficiency of the additives must not be altered by the severe conditions of temperature and pressure prevailing at the well bottom.

On the other hand, it is necessary to maintain a good compressive strength, good rheological properties and to prevent formation of free water and fluid loss.

It is therefore not surprizing, in view of the number and complexity of the parameters of cementing, and of the contradictory character of certain of them, that the oil industry has not been able to solve the problem of gas channeling satisfactorily.

In the prior art, it has been attempted to increase the viscosity of the interstitial water by adding a water-soluble polymer (and in particular by adding polyethyleneimine or derivatives thereof).

It has also been attempted to mix with the cement slurry a monomer, such as acrylamide, capable of undergoing flash-polymerization in situ before the slurry begins to thicken, therefore before the gas-channeling can occur. However, it has not been possible to control polymerization.

Thixotropic or expanding cements have also been used, but they have often proved ineffective.

According to GB Pat. No. 1 460 508, it has been attempted to mix a foaming agent with the cement slurry. In fact, this agent proved to be no longer available to form a stable foam under the action of the gas, as it was adsorbed on the cement particles.

One gas-producing agent recommended is aluminium powder, which already had two drawbacks: the carrier of the aluminium used was a glycol, and the gas produced was hydrogen, the dangers of which are known.

Moreover, gas production could not be controlled: too little, and it did not prevent gas channeling; too much and it rendered the slurry considerably permeable.

With the foregoing in mind, it is surprizing that the invention finally solves the problem of gas-channeling, not only whilst maintaining the imperative characteristics of the cement (pumpability, etc.), but also whilst improving certain of these properties, and therefore enabling the gas-channeling to be inhibited even at considerable depth (i.e., in particular, even at a high well temperature, which may be higher than 185° F. and even up to more than about 485° F.).

The compositions according to the invention comprise four essential constituents.

(a) a cement
(b) a latex
(c) a latex stabilizer
(d) water.

(a) The cement is a hydraulic cement belonging to any class among those currently used for cementing oil wells.

"Hydraulic cements" are understood to mean those cements which comprise compounds of calcium, aluminium, silicon, oxygen and/or sulfur, and which set and harden by reaction with water.

The following correspond in particular to this definition: cements commonly called "Portland cements", for example ordinary or rapid or extra-rapid hardening Portland cements, or cement resistant to sulfates, and other modified Portland cements; cements commonly called aluminous cements, calcium aluminate cements with high alumina content, and such cements containing small quantities of setting accelerators and retarders, air entraining agents, as well as Portland cements containing secondary constituents (fly ash, pozzolana), etc.

(b) The latex is selected from styrene/butadiene latices and more particularly from styrene (70–30% by weight)/butadiene (30–70% by weight) latices, not comprising groups incompatible with the cement.

The above percentages are determined by the fact that too large a quantity of butadiene provokes premature coagulation of the latex, whilst no film is formed if the latex contains too much styrene.

Latices were used to a fairly wide extent in cements for the oil industry about ten years ago, but are employed to a much lesser extent nowadays.

Thus latices were previously used in cements for the oil industry to improve the properties of mechanical strength (compressive strength, tensile strength, etc.) of the cement. To this end, styrenebutadiene latices were used, for example according to U.S. Pat. Nos. 3,228,907 and 4,151,150.

U.S. Pat. No. 3,228,907 does not recommend a stabilizer, and flocculation of the latex is observed; the recommended compositions are therefore totally ineffectual against the particular phenomenon of gas-channeling. Moreover, the compositions taught by this Patent proved to be difficult to pump.

In U.S. Pat. No. 4,151,150, the addition of a surface agent (sodium laurylsulfate) is recommended, but this does not prevent coagulation of the latex. The compositions described in this Patent are therefore also ineffectual in the inhibition of gas-channeling. Moreover, use thereof is limited to ambient temperature.

Belgian Pat. No. 886 819 describes a cement containing a latex and a wax, giving resistance to water penetration. On the one hand, this property manifests itself only in the fully hardened state, and on the other hand is due to the presence of wax, and not of latex.

U.S. Pat. No. 3,058,520 recommends the use of a latex (polyvinylacetate) in order to reduce the fluid loss. However, on the one hand this Patent does not mention the problem of gas-channeling and, especially, on the other hand, the use of the compositions described is limited by a temperature limit of about 122° F.

From the foregoing, it emerges that, although latices were indeed used in the oil industry, on the one hand they have never been recommended to inhibit gas-channeling, whilst this problem already preoccupied oil-men at that time, and on the other hand the compositions recommended could not have solved this problem, as set forth hereinabove, particularly due to difficulties of pumping, flocculation of the latex, and/or possibilities of use limited to low temperatures.

(c) The compositions according to the invention imperatively contain a latex stabilizer (which also has a secondary action of cement particle dispersing agent).

Thus, the stabilizer used according to the invention considerably modifies the film-forming property of the latex, since it allows this property to appear only in response to the occurrence of gas in the slurry.

This surprising "selective" response is responsible for the fact that the compositions according to the invention lead to a cement presenting a collection of excellent properties, i.e. immediate inhibition of the gas-channeling and improvement of the other properties of the cement (rheology, etc.), such group of properties never having been encountered beforehand. The surprising character of the selective film-forming response of the latex is accentuated by the fact that, from the stabilizers which have been tested, only a small number of stabilizer compounds manage to modify the properties of the latex in this way.

The useful stabilizers according to the invention are anionic polyelectrolytes such as melamine-formaldehyde resins modified by a sulfonic acid or sulfite, formaldehyde/sulfonated naphthalene resins or the condensation products of bi-nuclear sulfonated phenols and of formaldehyde.

Preferably, alkali metal salts of the condensation product of mononaphthalenesulfonic acid and of formaldehyde, and preferably still the sodium salt, will be chosen.

The prior art had recommended a condensation product of formaldehyde and naphthalenesulfonic acid as agent for reducing the fluid loss, either alone (U.S. Pat. No. 3,465,825) but, in this case, with very mediocre results, or in combination with a polyoxyethylene (U.S. Pat. No. 3,998,773), its action then being limited in temperature to 149° F.

Thus, this type of product had never been recommended in the totally different function (essentially "selective" stabilizer of the latex) which it performs in the compositions according to the invention.

It has also been discovered that at high temperatures of application, when retarders are needed to adjust cement setting time, some anionic cement retarders like lignosulfonates, partially desulfonated lignosulfonates or polyhydroxydicarboxylic acid can replace partially the preferred stabilizer. These cement retarders were found to behave in the same way as melamine and formaldehyde resins modified by a sulfonic acid or sulfite, but with a much lower efficiency. Furthermore, the amount of such a retarder which can be added in the cement is mainly governed by the setting time of the cement and not by the latex stability.

Then, the ratio between anionic retarder and stabilizer depends on the respective efficiencies of the retarder for both retarding cement setting and stabilizing the latex.

The compositions according to the invention make it possible to open up a new line of research in the control of gas-channeling, by enabling, for the first time, the action of the gas itself on an additive contained in the cement slurry, to be effectively used.

Moreover, these compositions according to the invention considerably increase the limit of depth of the well up to which control of gas-channeling is possible, since they are effective at least up to 212° F., and some considerably higher.

It will be noted that the prior cement compositions containing a latex could not be used beyond about 122° F. and that nothing suggested that operation could be carried out effectively, with compositions belonging to this general type, at 185° F. or more, and much less without gas-channeling.

For the man skilled in the art, this difference of 65° F. or more represents a considerable gain in terms of well depth, in a domain where it would not be an exaggeration to emphasize that any gain, even of only a few degrees, is highly significant.

According to the invention, it has also been discovered that the above cement slurry compositions could even be used in a much higher temperature range, i.e. from about 230° F. up to the temperature of degradation of the latex, viz. about 550° F. for a styrene (50% by weight)/butadiene (50% by weight) latex.

For the domain of application to cover such high temperatures, it is preferable to incorporate, in addition to the four main constituents (a) to (d) listed hereinabove (cement, latex, latex stabilizer, water), a particular silica component, e.g. 20 to 200 mesh size, which is preferably a silica flour having a particle size distribution similar to that of the cement powder used, so that the silica has no influence on the quality of latex necessary for preventing gas-channeling.

According to a particularly advantageous variant, the present invention therefore relates to the combination of five essential constituents: (a) cement, (b) latex, (c) latex stabilizer, (d) water, and (e) silica flour as cement slurry compositions for cementing oil wells, making it possible to control pressure gas-channeling up to temperature of up to about 550° F., such temperature being the beginning of degradation (at atmospheric pressure, in air) of the main lactices used.

According to this variant of the invention, the following will be incorporated:
from 20 to 50% BWOC of silica flour and preferably 30 to 35%
from 20 to 30% BWOC of latex from 3 to 15% BWO latex of latex stabilizer.

The above latex percentage, and also hereinafter referred, is based on the total volume of latex and not on the active polymer component.

The compositions according to the invention may contain the conventional additives for cement such as, in particular, antifoaming agents (for example based on tributylphosphate or polypropyleneglycol), setting retarders, etc.

Other examples of antifoaming agent: dibutyl phthalate, polyorganosiloxanes.

Examples of setting retarders: lignosulfonates, partially desulfonated lignosulfonates, polyhydroxymonocarboxylic or polyhydroxydicarboxylic acid (as high temperature retarders, and among them tartric acid and tartrates, D-gluconic acid, D-gluconates, heptonic acid and heptonates).

Other conventional additives for cement:

Accelerators: calcium salts

Lightening agents: pozzolana, fly ash, diatomaceous earths, silicates, expanded perlite, gilsonite, charcoal, active charcoal, glass or ceramic microspheres, etc.

Weighting materials: oxides of iron, titanium, barite, etc.

According to the invention, the proportions of the various constituents will be the following (by weight unless otherwise stated):

% latex/cement: 5-30, but the concentration of latex is directly connected with the temperature of application.

Preferably, 5-10% for a temperature of application of 80° to 120° F.

10-15% for a temperature of application of 120° to 180° F.

15-20% for a temperature of application of 180° to 200° F.

20-25% for a temperature of application of 200° to 230° F.

20-30% for a temperature of application of about 230° F.

% stabilizer/latex about 1-20 and preferably: 3-15.

% retarder/cement: 0.05-4 depending on temperature (optional).

% antifoaming agent/cement: 0.045-0.067 gal/sk (optional).

a preferred water content will be of the order of (about 30 to 60% by weight of cement (BWOC) and preferably 38 to 46% in case of Portland cement, minus the volume of the liquid additives.

The best results were obtained with the Rhodopas SB012 latex, defined hereinbelow.

The invention will be more readily understood on reading the following non-limiting examples and with reference to the accompanying drawings, in which:

FIG. 1: observation of the cement compositon using a scanning electron microscope: [×5000]

Cemoil Class G cement

Rhodopas SB012 14% BWOC

Water 44% BWOC minus the volume of latex, not containing stabilizer. (The sample was freeze-dried after the cement became unpumpable when submitted to temperature (185° F.) and stirring).

Figure 2:
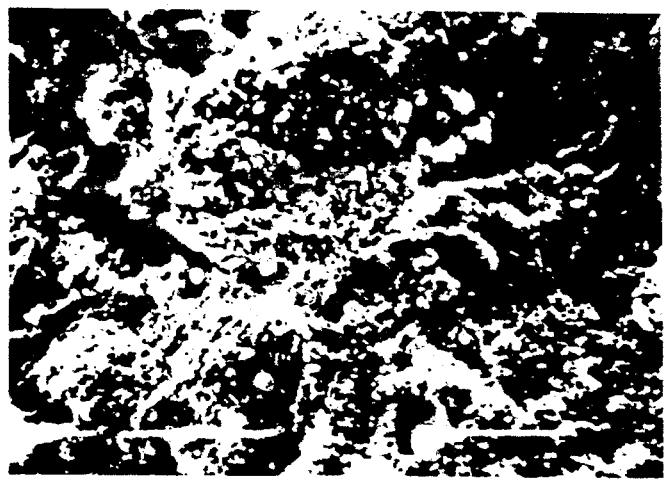
Figure 3:

FIGS. 2 and 3: observation of the cement composition by a scanning electron microscope: [FIG. 2:×2500; FIG. 3:×10 000]

Dyckerhoff Gulf Class G cement

Rhodopas SB012: 14% BWOC

Stabilizer 8% by weight of latex (as defined hereunder pages 12-13)

Water 44% BWOC minus the volume of the liquids. (The sample was freeze-dried after 10 days curing at 135° F. once the cement became unpumpable due to cement hydration).

Figure 4:
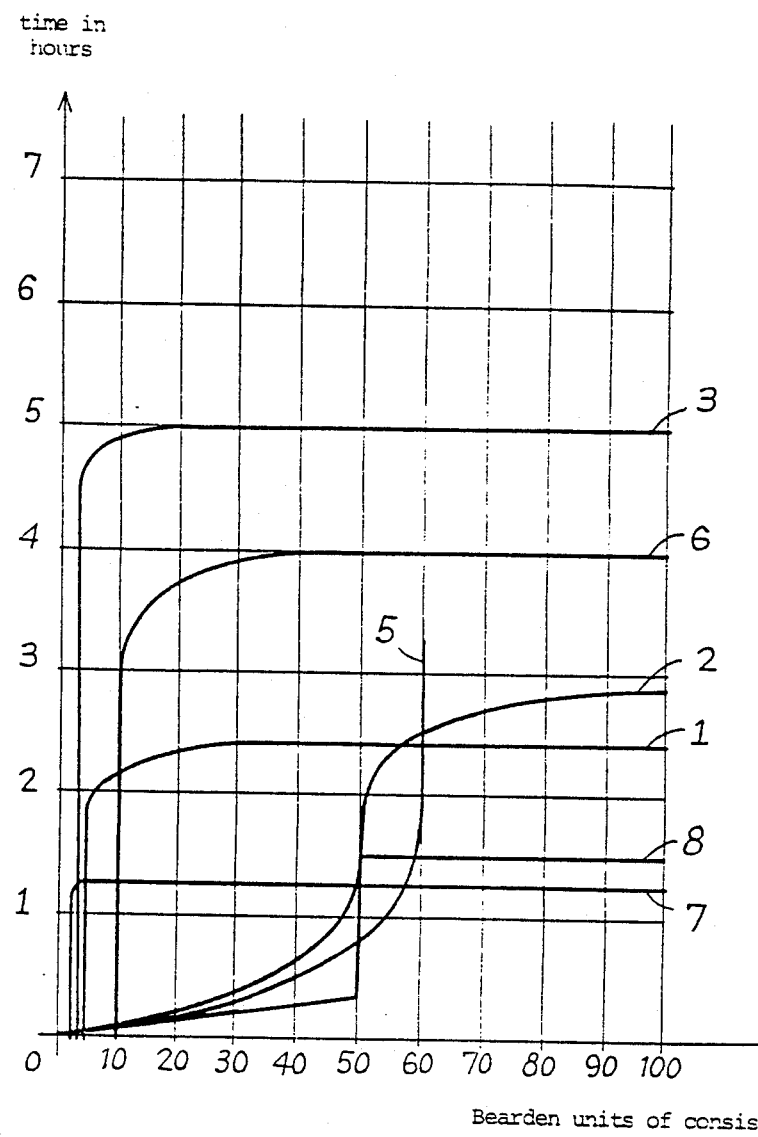

FIG. 4: Thickening time well simulation test of the compositions described in Table II hereinafter.

The simulated conditions are as follows:

Surface temperature 80° F.

Surface pressure 1500 psi

Bottom hole pressure 10200 psi

Bottom hole circulating temperature 185° F.

Time to reach final temperature 44 mins.

Heating rate 2.38° F./min.

Time to reach final pressure 44 mins. (API Schedule No. 7g5)

(Pressurized consistometer test)

Tests 2, 5 and 8 were run at atmospheric pressure.

Figure 5:
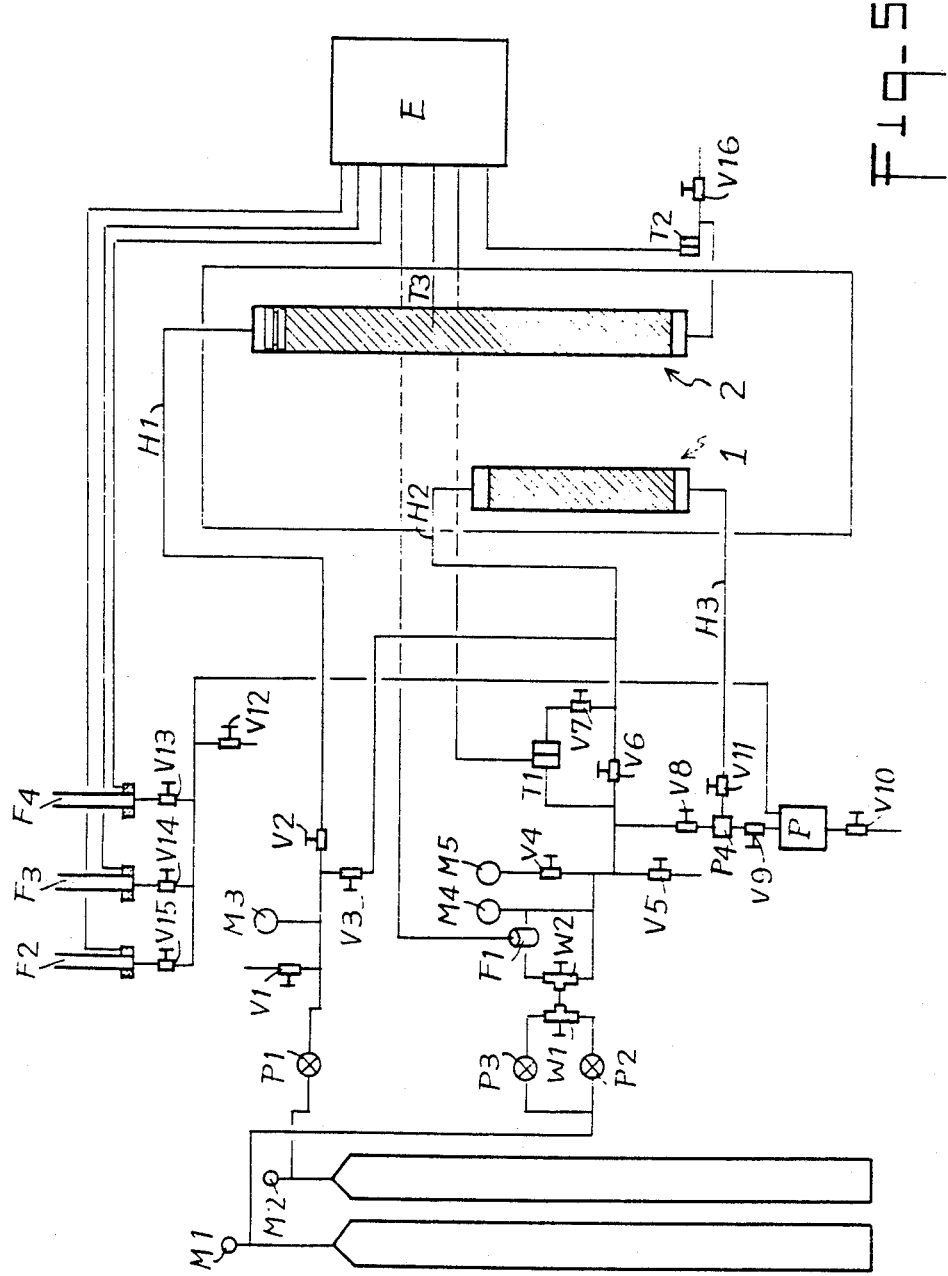

FIG. 5: Diagram of the cell for gas-channeling test used in Example 3.

In this Figure, the references have the following meanings:

E: recorders

1: DP cell (Cf. Example 3 hereinafter)

A: HP cell (cf. Example 3 hereinafter)

P : water trap

The other references are used in their meaning as known to the man skilled in the art:

V: valve

T: pressure transducer

P: pressure regulator

M: manometer

F: flowmeter

H: hose

Figure 6:

FIG. 6: Observations of the cement composition by the electron microscope: [DP 24 slurry;×5000]

Cemoil Class G cement

Antifoaming agents: 0.05 gal/sk

Dow 465 latex: 18% BWOC

Stabilizer: 6% BWO latex (as defined hereunder pages 12-13)

Water: 44% BWOC minus the volume of liquid additives.

Figure 7:
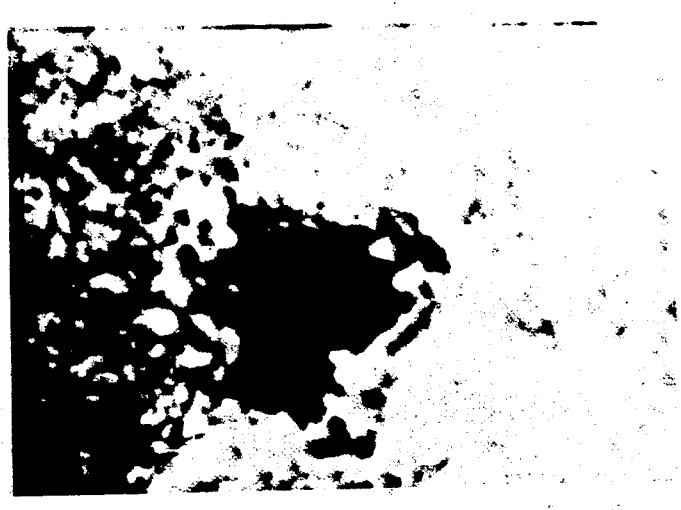

FIG. 7: Observation of the cement composition by an electron microscope: [×10 000]

Dyckerhoff North Class G cement

Antifoaming agent: 0.05 g/sk

Rhodopas SB012: 19% BWOC

Stabilizer: 12% BWO latex (as defined hereunder pages 15-16)

Retarder: 0.1% BWOC

Water: 44% BWOC minus the volume of liquid additives.

[FIGS. 6 and 7 correspond to a sample freeze-dried after a gas channeling test at 185° F. when the cement was hard, in the cell where no gas was allowed to flow.]

Figure 8:
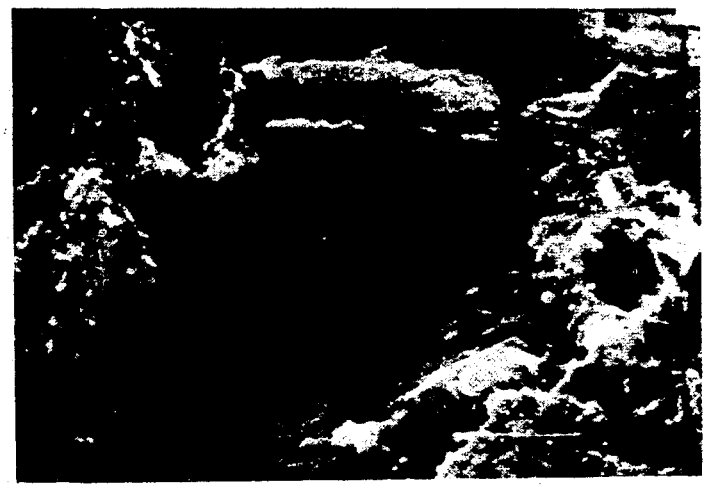
Figure 9:

FIGS. 8 and 9: Observation of the cement composition by an electron microscope: [FIG. 8:×2500; FIG. 9:×5000]

Dyckerhoff North Class G cement

Antifoaming agent: 0.05 g/sk

Litex 6301: 19% BWOC

Stabilizer: 15% BWO latex (as defined hereunder pages 12-13)

Retarder 0.1% BWOC

Water: 44% BWOC minus the volume of liquid additives.

[FIGS. 8 and 9 correspond to samples freeze-dried after a gas channeling test at 185° F., when the cement was hard, and coming from the cell were gas was allowed to flow.

Figure 10:

FIG. 10: Observation of the cement composition by an electron microscope: [×2500]
Cemoil Class G cement
Dow 465 latex: 19% BWOC
Stabilizer: 6% BWO latex (as defined hereunder pages 12–13)
Water: 44% BWOC minus the volume of liquid additives
Antifoaming agent: 0.05 gal/sk [Sample Freeze-dried after a gas channeling test at 185° F., when the cement was hard, and coming from the DP cell where gas was allowed to flow]

A preferred composition is:
API Class G cement;
Latex: Rhodopas SB012, in the amount of 5 to 30% by weight of cement;
Stabilizer: sodium salt of the condensation product of β-naphthalenesulfonic acid with formaldehyde, in the amount of 3–15% by weight of latex; and
Fresh water: 44% by weight of cement minus the volume of latex and stabilizer.

The concentration of latex depends on the temperature:
86° F. 5–10%
122° F. 10–15%
185° F. 15–20%
212° F. 20–25%
230° F. 20–30%

According to the invention, it is possible to use for mixing both fresh water and sea water, salt water, from 0% NaCl up to saturation in salt (37% NaCl).

EXAMPLE 1

Stabilization of latices within cement slurries

The stability of latices within cement slurries was assessed under the following two conditions (a) and (b):
(a) Fluid cement:
By measuring the rheological properties of the cement slurry after a certain period of stirring at a selected temperature.
(b) Set and hard cement:
By visual observation using a scanning electron microscope, after freeze-drying of cement samples.

Rheological properties

Cement slurries were mixed at room temperature using a high shear rate mixer, Waring Blendor type, according to API Standard RP 10 B, section 5, then stirred for 20 mins. at a selected temperature in an equipment known as atmospheric consistometer, CHANDLER type, according to API Standard RP 10 B, section 9.

Then rheological parameters were measured using a FANN 35 V-G viscometer, at the same temperature, according to API Standard RP 10 B, appendix H.

In case of complete instability of the latex, the cement slurry is unpourable when taken out of the consistometer, or even before the end of the stirring period, as indicated by the consistency of the slurry well above 100 units, measured with a calibrated spring or potentiometer.

Not all the cement slurries' rheological parameters can be measured with the FANN 35 VG and the criterion of instability will then be the unpourability of the slurry. If the cement slurry is pourable, the rheological parameters will be measured and the criterion of latex stability will be based on the values of rheological parameters, such as plastic viscosity and yield stress.

Table I below shows the influence of the stabilizer on latex stability in cement slurries containing various types of polystyrene-butadiene latices with or without stabilizers, at different temperatures, on the basis of flow properties of cement slurries.

The following latices were used (% by weight):

|  | STYRENE (%) | BUTADIENE (%) |
| --- | --- | --- |
| DOW 465 | 66 | 33 |
| LITEX 6301 | 50 | 50 |
| RHODOPAS SB012 | 50 | 50 |

Dow 465 typically has a total solids content of 44.5%.
Litex 6301 typically has a total solids content of 46–47%.

The antifoaming agent used is a polyglycol with a mean molecular weight of 4000.

The stabilizer used is the sodium salt of the condensation product of β-naphthalenesulfonic acid with formaldehyde.

Sedimentation tests run at the same time on the same cement slurries have shown that the unpourability of the slurry is directly related to flocculation of the latex and a strong interaction of these latex flocs with cement grains, giving rise to a gel structure of very high viscosity.

Scanning electron microscope observation

Latex modified cement slurries, with or without stabilizer, were freeze-dried then observed with an SEM after having been stirred at 185° F. up to complete thickening.

Certain of these slurries were cured for 10 days at the temperature indicated above, then freeze-dried and examined.

When a latex is used without stabilizer, it coagulates very quickly when subjected to heating and stirring.

This coagulation is represented (FIG. 1) by a flocculation of latex particles on or between cement grains, and a strong bridging is formed between cement grains and latex flocs. Thus a gel structure is formed, and the cement slurry can no longer be pumped.

When the latex is stabilized with the stabilizer as defined hereinabove, it remains as individual polymer particles even 10 days after cement setting.

This is particularly clear in FIGS. 2 and 3, where no latex flocs or latex film are visible, but which show only small polymer particles of 0.2–0.4μ uniformly distributed in the whole mass, on or between cement grains which are hydrated normally.

EXAMPLE 2

Cement slurry properties

Properties referred to in this paragraph are fluid loss control, free water control and pumping time. All these properties are measured using special equipment and specifications required by the American Petroleum Institute (API Standard RB 10, 1st Edition January 1982).

Fluid loss tests, free water tests and thickening time tests (pumping time) were run on cement slurry compositions containing a polystyrene-butadiene latex stabilized with the sodium salt of the condensation product of β-naphthalenesulfonic acid with formaldehyde.

Comparative tests with the same cement slurries without stabilizer were possibly only on the basis of pumping time, as the fluid loss and free water tests, usually performed after the slurry has been stirred for 20 mins. at adequate temperature, could not be run on unpourable slurries.

Compatibility with retarders and possibilities of pumping time adjustment were also studied, using a lignosulfonate type retarder.

Data for comparing the results with coventional cement slurries without latex at the temperature of 185° F.

A good fluid loss control is represented by a filtration rate of less than 150 ml/30 mins.

A very good fluid loss control is represented by a rate of filtration of less than 100 ml/30 mins.

Free water content preferably not more than 1.4% of volume of slurry.

Thickening time curve (pumpability curve) should be relatively flat up to cement thickening (there must be no premature plateau due to gelation) and it must be checked that cement thickening is due to cement hydration and not to the development of a gel structure due to the coagulation of latex. To this end, when the cement slurry reaches the state of unpumpability (corresponding to 100 units of consistency), it is maintained under the same temperature and pressure conditions for a further 30 mins.: if thickening is due to cement hydration, 30 mins. later the cement must have the consistency of a more or less friable soil or rock and no longer the consistency of a paste.

Table II below gives the results of fluid loss, free water and thickening time, the test having been run at 185° F. The thickening time curves (pumpability curves) are shown in FIG. 4.

The antifoaming agent used is a polyglycol with a mean molecular weight of 4000.

The retarder used is a derivative of lignosulfonate.

Main conclusions:

Fluid loss and free water control are always excellent (results lower than 100 ml/30 mins).

When a latex is used without stabilizer, it coagulates within the cement slurry when subjected to temperature and stirring, and a gel structure is formed, visualized by a plateau of gelation on the pumpability curve.

This plateau of gelation is around 60 units of consistency, which is representative of an unpourable and hardly pumpable slurry. In this case, when the cement reaches the maximum recordable consistency (100 units of consistency), it is still a gel.

When a latex and a stabilizer are used, no gelation is produced and the maximum recorded consistency is representative of cement hydration.

Polystyrene-butadiene latices stabilized with the stabilizer indicated hereinabove do not retard cement setting, and the thickening time can be perfectly well adjusted (for example within the range of 4-5 hrs.) with a conventional retarder used at usual concentrations.

EXAMPLE 3

Gas channeling inhibition property of latex modified cement slurries

The gas channeling inhibition property was assessed in laboratory equipment specially designed for this purpose and called gas channeling test cell.

This equipment, which is schematically shown in FIG. 5, essentially consists of two separate columns filled with cement.

In the first column, called HP cell, is measured the cement pore pressure decrease versus time when the cement is subjected to a constant head pressure through a piston, whilst, in the second column, called DP cell, is measured the flow property of the gas in the cement column, under a constant differential pressure, when the pore pressure of the cement has sufficiently dropped in the first cell.

The gas channeling inhibition property of a cement slurry may then be simply determined by the maximum recorded gas flow rate, all the other parameters being constant in all tests.

The test conditions are as follows:
temperature 185° F.
head pressure of both cells: 40 bars
back pressure in DP cell: 35 bars
gas flow is allowed when the cement pore pressure reaches 30 bars, i.e. has dropped from 40 to 30 bars.

The antifoaming agent consists of a polyglycol with a mean molecular weight of 4000.

The liquid thixotropic additive consists of an aqueous liquid composition comprising iron sulfate and aluminum sulfate, as described in British Patent No. 2 030 976.

Table III hereinbelow indicates the results of tests on conventional slurries (X), slurries according to the invention, a slurry without stabilizer (XX), and a slurry containing a non-ionic surface active agent (x).

Main conclusions:

Conventional cement slurries (e.g. without latex) provide high gas channeling rates (between 300 and 1100 Scm$^3$/min), which corresponds to no gas channeling inhibition property.

Cement slurries containing a latex at 19% BWOC and containing the adequate quantity of stabilizer, correspond to very low flow rates (3 and 25 Scm$^3$/min), which corresponds to an excellent gas channeling inhibition property.

Cement slurries containing a latex but without stabilizer lead to medium flow rates (100 Scm$^3$/min). It therefore appears that when the latex is not stabilized, the mechanism of film formation through gas flowing is not produced, and that the improved results with respect to conventional cement slurries are only a consequence of a partial, non-uniform plugging of cement pores by latex flocs, which naturally reduces somewhat the permeability of the cement.

EXAMPLE 4

Mechanism of gas channeling prevention through the use of latex

The mechanism of gas channeling prevention through the use of a latex is illustrated with scanning electron microscope observations: samples coming both from the HP cell (where there is no gas flow) and from the DP cell (where gas flow is allowed) are freeze-dried after gas channeling tests, when the cement was hard, after which these freeze-dried samples are examined with the SEM.

FIGS. 6 and 7 correspond to samples coming from the HP cell, and clearly show that the latex particles are totally stabilized within hardened cement when there is no gas, whilst FIGS. 8, 9 and 10 which correspond to samples coming from the DP cell, where gas is allowed to flow, show a film formation due to dehydration by passage of gas.

The formation of multiple latex film barriers or film sheets is particularly visible in FIGS. 8 and 9. These film barriers slow down gas channeling more and more up to complete blockage of gas channeling.

It will also be noted that, during all the gas channeling tests run with (styrene-butadiene) latices stabilized by the condensation product of naphthalenesulfonate and of formaldehyde, no gas flow was ever observed at the interface between the cement and the metal wall. This is not the case when conventional slurries are used. This property of improving bonds between the cement and the metal, in the case of a stabilized latex system, has also been demonstrated by determinations of the shear-bond strength.

EXAMPLE 5
(COMPARATIVE EXAMPLE)

In this example, cement compositions were used containing different types of latex and, for each composition, the formaldehyde-naphthalenesulfonic acid stabilizer used according to the invention.

The results which are shown in Table IV hereinbelow show that, from the various types of latices which were tested, only styrene-butadiene latices can be used since, for the other latices, the slurry is not pourable, this being an obviously prohibitory disadvantage.

EXAMPLE 6

A test at 212° F. was run on the following slurry:
Cemoil Class G cement
Antifoaming agent: 0.05 g/sk
Rhodopas SBO12 latex: 23% BWOC
Stabilizer (formaldehyde-naphthalenesulfonate): 5% BWO latex
Fresh water: 19% BWOC
Maximum rate of gas flow: 2 Scm$^3$/min.

This result is excellent and the compositions according to the invention may therefore even be used at 212° F. Moreover, the behaviour of the cement during this test leads to envisaging use thereof at even higher temperatures.

EXAMPLE 7 (COMPARATIVE EXAMPLE), 8 AND 9

These Examples concern the incorporation of silica flour to allow higher temperatures of use.

The cement slurry compositions used, as well as the results obtained, are shown in Table V hereinbelow.

The cell shown in FIG. 5 of the accompanying drawings has been used for the test.

The test conditions were as follows:
temperature: 266° and 320° F.
head pressure of the two cells: 40 bars
back-pressure in cell DP: 20 bars,
gas is allowed to flow when the pressure in the pores of the cement reaches 18 bars, i.e. has decreased from 40 to 18 bars.

Principal conclusion:

A conventional cement slurry not containing any latex (comparative Example 7) leads to a very high rate of gas-channeling, which corresponds to an absence of characteristic of gas-channeling inhibition. On the contrary, a cement slurry containing the adequate quantity of latex and stabilizer leads to a zero rate of flow of gas, whether it be at a temperature of 266° F. or at a temperature of 320° F., which corresponds to an excellent characteristic of gas-channeling inhibition. (Examples 8 and 9 according to the invention).

Moreover, thermogravimetric and thermodifferential analyses have shown that the preferred latex recommended in the invention, polystyrene-butadiene containing from 70 to 30% by weight of styrene and from 30 to 70% by weight of butadiene, begins to be degraded under the effect of temperature only from 518° F. As the other constituents included in the cement composition described in the invention, namely cement, stabilizer and water, are not degraded by the effect of temperature, at least up to a temperature of 572° F., it appears that the invention is also applicable in this variant at temperatures greater than 320° F., the upper limit of application being determined by the temperature of degradation of the latex used, in the present case 518° F.

Such temperatures make it possible, for the first time, efficiently to treat deep wells, and even geothermal drilling wells.

EXAMPLE 10

Stabilization of latices within cement slurries at high temperature.

The stability of latices within cement slurries was appreciated through the measurement of cement slurry rheology as presented in table VI.

The quantity of anionic retarder was first adjusted to get 6 hours of cement thickening time and then, the quantity of stabilizer defined to get optimum latex stabilization. It was found that when the optimum quantity of retarder is used, the quantity of stabilizer can be reduced by 60%.

TABLE I

| Cement slurry composition | Pourability after stirring for 20 mn | Rheological parameters PV (cP) | Rheological parameters YS lb/100 ft$^2$ | Test temperature |
|---|---|---|---|---|
| Basic composition | | | | |
| Cement 100 parts | | | | |
| Latex 14% by weight of cement | | | | |
| Stabilizer X % by weight of latex | | | | |
| Antifoaming agent 0.4% by weight of cement | | | | |
| Water 44% by weight of cement minus volume of liquid additives. | | | | |
| Dyckerhoff Gulf Class G Dow 465 (1) Stabilizer 0% | UNPOURABLE | | | 185° F. |
| Dyckerhoff Gulf Class G Dow 465 Stabilizer 8.0% | POURABLE | 35 | 6 | 185° F. |
| Dyckerhoff North Class G Litex 6301 (2) Stabilizer 0% | UNPOURABLE | | | 185° F. |
| Dyckerhoff North Class G LITEX 6301 Stabilizer 16% | POURABLE | 26 | 25 | 185° F. |
| Cemoil Class G LITEX 6301 Stabilizer 0% | UNPOURABLE | | | 185° F. |
| Cemoil Class G LITEX 6301 Stabilizer 16% | POURABLE | 22 | 5 | 185° F. |
| Dyckerhoff North Class G Rhodopas SB012 (3) Stabilizer 0% | UNPOURABLE | | | 185° F. |
| Dyckerhoff North Class G Rhodopas SB012 Stabilizer 4.0% | POURABLE | 26 | 1 | 185° F. |
| Cemoil Class G Rhodopas SB012 | UNPOURABLE | | | 185° F. |

TABLE I-continued

| Cement slurry composition | Pourability after stirring for 20 mn | Rheological parameters PV (cP) | YS lb/100 ft² | Test temperature |
|---|---|---|---|---|
| Stabilizer 0% Cemoil Class G Rhodopas SB012 Stabilizer 8.0% | POUR-ABLE | 21 | 14 | 185° F. |

(1) Trademark of Dow Chemical Company
(2) Trademark of Chemische Werke Huls AG
(3) Trademark of Rhone Poulenc Company
PV plastic viscosity
YS yield stress Cemoil class G cement is the API class G cement manufactured by "Compagnie des Ciments Belges", Gaurain-Ramecroix, Belgium.

Dyckerhoff Gulf Class G cement is an API Class G cement manufactured by Dyckerhoff Zementwerke AG, Wiesbaden, Germany.

Dyckerhoff Class G cement is an API Class G cement manufactured by Dyckerhoff Zementwerke AG.

Rhodpas SBO12 is a 50:50 styrene-butadiene latex (50% solids) manufactured and sold by Rhone-Poulenc Specialities Chimiques, Courbevoie, France.

TABLE II

| Cement slurry composition | Fluid loss ml/30 mn (2) | Free Water % by volume (3) | Thickening Time - 10200 psi - 185° F. API 7 g 5 100 Bc Hrs:Min. | Plateau of gelation at 100 Bc | Gel or set at 100 Bc |
|---|---|---|---|---|---|
| Basic slurry | | | | | |
| Cement | | | | | |
| Antifoaming agent 0.4% BWOC | | | | | |
| Latex · % BWOC | | | | | |
| Stabilizer y % BWO latex | | | | | |
| Retarder z % BWOC | | | | | |
| Water 44% - volume of liquid additive | | | | | |
| 1/ Cemoil Class G cement Rhodopas SB012 14% Stabilizer 8% | 88 | 0 | 2:15 | NO | SET |
| 2/ Cemoil Class G cement(1) Rhodopas SB012 14% | | | 2:50 | Yes | GEL |
| 3/ Dyckerhoff North Class G cement Rhodopas SB012 14% Stabilizer 8% Retarder 0.1% | 88 | 0 | 5:00 | NO | SET |
| 4/ Dyckerhoff Gulf Class G Litex 6301 14% Stabilizer 12% | 70 | 0 | | | |
| 5/ Cemoil Class G cement (1) Litex 6301 14% | | | 3:00 | YES | |
| 6/ Dyckerhoff North Class G Litex 6301 19% Stabilizer 20% Retarderr 0.2% | 60 | 0 | 4:00 | NO | SET |
| 7/ Dyckerhoff Gulf Class G Dow 465 14% Stabilizer 8% | 28 | 0 | 1:13 | NO | SET |
| 8/ Dyckerhoff Gulf Class G (1) Dow 465 14% | | | 1:40 | YES | GEL |

1 to 3 and 5 to 8 Thickening time see corresponding curves FIG 4
(1) Thickening Time tests run at atmospheric pressure
(2) Tests run at 185° F according to API standards
(3) Tests run at 185° F according to API standards attempt

TABLE III

| CEMENT SLURRY COMPOSITION | REMARKS | MAXIMUM GAS FLOW RATE in Scm³/mn |
|---|---|---|
| Cemoil Class G cement Polyethylene imine 0.4 gal/sk Formaldehyde-naphthalene sulfonate 0.02 gal/sk Antifoaming agent 0.05 gal/sk Water: 44% BWOC minus volume of liquid additive | [X] Conventional liquid Fluid loss agent | 1133 |
| Cemoil Class A cement Liquid thixotropic additive 0.8 gal/sk Antifoaming agent 0.05 g/sk Water: 70% BWOC minus volume of liquid additive | [X] Conventional thixotropic slurry | 1130 |
| Dyckerhoff Gulf Class G cement Hydroxyethyl cellulose 1% BWOC Calcium Chloride 2% BWOC Antifoaming agent 0.05 g/sk Water: 44% Minus volume of liquid additive | [X] Conventional cellulosic type solid Fluid loss agent | 300 |
| Cemoil Class G cement Antifoaming agent | Latex A — stabilizer | 3 |

TABLE III-continued

| CEMENT SLURRY COMPOSITION | REMARKS | MAXIMUM GAS FLOW RATE in Scm³/mn |
|---|---|---|
| 0.05 gal/sk Rhodopas SB012 19% BWOC Formaldehyde-Naphthalene sulfonate 3.6% BWO latex Water: 44% BWOC minus volume of liquid additive | | |
| Cemoil Class G cement Antifoaming agent 0.05 gal/sk Dow 465 19% BWOC Formaldehyde-naphthalene sulfonate 6% BWO Latex Water: 44% BWOC minus volume of liquid additive | Latex B + stabilizer | 25 |
| Cemoil Class G cement Antifoaming agent 0.05 gal/sk Rhodopas SB012 19% BWOC Water: 44% of BWOC minus volume of liquid additive | XX Latex A without stabilizer | 100 |
| Dyckerhoff Gulf Class G cement Antifoaming agent 0.05 gal/sk Litex 6301 19.0% BWOC IGEPAL CO 977[(1)] 10% BWO Latex Water: 44% BWOC minus volume of liquid additives | ⊗ Latex C + non ionic surfactant | 120 |
| Dyckerhoff Gulf Class G cement Antifoaming agent 0.03 gal/sk LITEX 6301 19% BWOC Formaldehyde-Naphthalene Sulfonate 10% BWO latex Water: 44% BWOC minus volume of liquid additives | Latex C + stabilizer | |

[(1)]Trademark of GAF corporation for a condensation product of nonylphenol with 50 moles ethylene oxide.

TABLE IV

| Cement slurry composition | Nature of the resin | Manufacturer | Pourability after 20 mn stirring | Rheological parameters PV (cp) | Test temperature (°F.) |
|---|---|---|---|---|---|
| Cement: 100 parts Latex: 14% by weight of cement Stabilizer: 15% by weight of latex Antifoaming agent: 0.4% by weight of cement Water: 44% by BWOC minus volume of liquid additive | | | | | |
| ACRONAL DS 3168 | ACRYLIC | BASF | UNPOURABLE | >500 | 185 |
| ACRYMUL AM 355 | ACRYLIC | PROTEX | UNPOURABLE | >500 | 185 |
| RHODOPAS DS 911 | STYRENE ACRYLATE | RHONE POULENC | UNPOURABLE | >500 | 185 |
| MOWITON LP 3600 | STYRENE ACRYLATE | HOECHST | UNPOURABLE | >500 | 185 |
| MOWITON M 310 | Vinyl acetate - ethylene-vinyl laurate | HOECHST | UNPOURABLE | >500 | 185 |
| VINNAPAS CEP 15 | Vinylacetate-ethylene vinyl chloride | WACKERS | UNPOURABLE | >500 | 185 |
| VINNAPAS H 54/15 C | Vinyl acetate | WACKERS | UNPOURABLE | >500 | 185 |

TABLE V

| Ex. | Cement slurry composition | Temperature °F. | Maximum rate of gas flow Scm3/min |
|---|---|---|---|
| 7 (comparative) | Dyckerhoff Gulf Class G cement Silica flour 35% BWOC (*) Retarder of lignosulfonate type 0.4% BWOC antifoam agent 2 cm³/kg water: 56% BWOC minus the volume of the liquid additives | 266 | 5000 |
| 8 | Dyckerhoff Gulf Class G cement Silica flour 30% BWOC (*) Retarder of lignosulfonate type 0.6% BWOC Formaldehyde naphthalene sulfonate 3% BWO latex Rhodopas SB012 23% BWOC Anti-foam agent: 4.44 cm3/kg Water: 60% BWOC minus the volume of the liquid additives | 266 | 0 |
| 9 | Dyckerhoff Class G cement Silica flour 35% BWOC (*) | 320 | 0 |

TABLE V-continued

| Ex. | Cement slurry composition | Temperature °F. | Maximum rate of gas flow Scm3/min |
|---|---|---|---|
|  | Retarder of lignosulfonate type 1.5% BWOC Formaldehyde naphthalene sulfonate 6% BWO latex Rhodopas SB012 28% BWOC Anti-foam agent: 4.44 cm3/kg Water: 56% BWOC less the volume of the liquid additives |  |  |

RHODOPAS SB012: styrene (50% by weight)/butadiene (50% by weight) latex.
(*) Particle size distribution of the silica flour used:
<100µ: 100%
<50µ: 90%
<20µ: 45%
<10µ: 23%
<5µ: 8%

TABLE VI

|  | RHEOLOGICAL PARAMETERS | | | THICKENING TIME |
|---|---|---|---|---|
|  | TEST TEMP. °F. | P.V. (cP) | Y.V. (lb/100 sqft) | 16100 psi-245° F. API 9 g 5 |
| Basic slurry Dyckerhoff Gulf class G Cement Antifoaming agent 0.4% BWOC Rhodopas SB012 19% BWOC Stabilizer x % BWO latex Retarder y % BWOC Silica flour 35% BWOC Water 44% BWOC - volume of liquid additives |  |  |  |  |
| Stabilizer 5% Retarder 0% | 185 | 30 | 2 | 0 H 50 mn |
| Stabilizer 0% Retarder 0.35% | 185 | 50 | 40 | 6 H 05 mn |
| Stabilizer 2% Retarder 0.35% | 185 | 32 | 1 | 6 H 15 mn |

Retarder was a 1:1 by weight mixture of lignoamine and sodium glucoheptonate.

What we claim is:

1. Cement slurry compositions for cementing oil wells having improved properties of the cement and inhibiting pressure gas channeling in the cemented annulus, even at high temperature, said composition consisting essentially of a hydraulic cement, about 5-30% by weight of cement of a compatible styrene (70-30 weight percent)/butadiene (30-70 weight percent) copolymer latex, about 1-20% by weight of latex of a latex stabilizer selected from the group consisting of
   lignosulfonates and their partly desulfonated derivatives
   sulfonic acid or sulfite modified melamine-formaldehyde resins
   formaldehyde/sulfonate naphthalene resins, and
   condensation products of bi-nuclear sulfonated phenols and of formaldehyde
and water in an amount such that the total fluid content of water, latex and stabilizer is about 30-70% by weight of cement.

2. The composition of claim 1, wherein the copolymer contains about 50% by weight of styrene and about 50% by weight of butadiene.

3. The composition of claim 1, wherein the copolymer contains about 66% by weight of styrene and about 33% of butadiene.

4. The composition of claim 1, wherein the stabilizer is an alkali metal salt of the condensation product of mononaphthalenesulfonic acid and of formaldehyde.

5. The composition of claim 1, wherein its composition is as follows:
   cement API Class G
   latex: styrene/butadiene 50/50% by weight in an amount of about 5-30% by weight of cement
   stabilizer: sodium salt of the condensation product of β-naphthalene sulfonic acid with formaldehyde in the amount of 3-15% by weight of latex,
   fresh water: an amount such that the total fluid content of water, latex and stabilizer is about 30 to 60% by weight of cement.

6. The composition of claim 1 wherein the proportion of latex is from 20 to 30% by weight of cement and further comprising from 20 to 50% by weight of cement of a silica flour whose particle-size distribution is comparable to that of the cement powder.

7. The composition of claim 1, further containing at least one conventional additives for cements.

8. The composition of claim 6 comprising:
   API Class G cement
   Silica flour, 30-35% by weight of cement
   Lignosulfonate retarder, 0.6-1.5% by weight of cement
   50:50 Styrene/butadiene latex 23-28% by weight of cement
   Latex stabilizer-formaldehyde naphthalene sulfonate 3-6% by weight of latex,
   Water such that the total fluid content of water, latex and stabilizer is 56-60% by weight of cement.

9. The composition of claim 1 wherein the latex stabilizer is a sulfonic acid or sulfite modified melamine-formaldehyde resin.

10. The composition of claim 4, wherein the alkali metal salt is the sodium salt.

11. The composition of claim 1 or 5 wherein the proportion of latex is varied within the range of about 5-30% by weight based on the temperature of application of the composition according to the following schedule:
   about 5-10% by weight for a temperature of about 80°-120° F.
   about 10-15% by weight for about 120°-180° F.
   about 15-20% for about 180°-200° F.
   about 20-25% for about 200°-230° F. and about 20-30% for about 230° F. to the degradation temperature of the latex.

12. The composition of claim 1 wherein the proportion of stabilizer is 3 to 15%.

13. The composition of claim 5 wherein the cement is a Portland cement and the amount of water is 38 to 46%.

14. In the use of cement slurry composition in oil wells, the improvement which comprises employing the cement slurry composition of claim 1 as said cement slurry.

15. In the process of cementing an oil well up to a temperature of 212°-230° F., the improvement which comprises employing the cement slurry composition of claim 1 whereby pressure gas channeling in the cemented annulus is prevented.

16. In a process of cementing a well at temperatures of about 230° F. to about 550° F., the improvement which comprises employing the cement slurry composition of claim 6 or 8 whereby pressure gas channeling in the cemented annulus is prevented.

17. The composition of claim 1 having a plastic viscosity (API Standard RP 10B) of 21-35 cP and a yield stress of 1-25 lb/100 sq ft.

* * * * *